United States Patent [19]
Hizuka et al.

[11] Patent Number: 6,091,876
[45] Date of Patent: Jul. 18, 2000

[54] EXTRA LENGTH ACCOMMODATION STRUCTURE FOR OPTICAL FIBER

[75] Inventors: Hidehiko Hizuka; Shin Watanabe, both of Sapporo; Katsumi Kanasaki; Katsuki Matsunaga, both of Kawasaki; Takayuki Sakuma, Sapporo, all of Japan

[73] Assignee: Fujitsu Limited, Kawasaki, Japan

[21] Appl. No.: 09/177,825

[22] Filed: Oct. 23, 1998

[30] Foreign Application Priority Data

Jun. 18, 1998 [JP] Japan .................................. 10-171141

[51] Int. Cl.$^7$ ...................................... G02B 6/00
[52] U.S. Cl. ............................................. 385/135; 385/137
[58] Field of Search .................................... 385/134, 135, 385/136, 137, 138, 139

[56] References Cited

U.S. PATENT DOCUMENTS 5,383,051  1/1995  Delrosso et al. .................... 385/135 X
5,911,027  1/1995  Macken et al. .......................... 385/135

FOREIGN PATENT DOCUMENTS

2 678 076  12/1992  France .
3-89401    9/1991   Japan .
6-27331    2/1994   Japan .

Primary Examiner—Phan T. H. Palmer
Attorney, Agent, or Firm—Staas & Halsey, LLP

[57] ABSTRACT

The extra length accommodation structure for the optical fiber includes a base and first and second winding drums pivotably supported to the base. Each of the first and second winding drums is pivotable between a position where it is positioned over the base and another position where it is partially projected from the base. The first winding drum is pivotably supported through a first support member to the base, and the second winding drum is pivotably supported through a second support member to the base.

10 Claims, 10 Drawing Sheets

EXTRA LENGTH ACCOMMODATION STRUCTURE FOR OPTICAL FIBER

BACKGROUND OF THE INVENTION

1. Field of the Invention

The present invention relates to an extra length accommodation structure for optical fibers in a communication device.

2. Description of the Related Art

In recent years, a transmission line for a communication device has been changed from an electrical cable (coaxial cable or twisted cable) to an optical cable. Particularly in a communication device related to Fiber To The Home (FTTH), a size reduction of the communication device is being pursued in consideration of an introduction of the communication device into every home. However, the workability in connecting an optical cable to the communication device is reduced by the size reduction, so it is necessary to provide a structure which can easily accommodate an extra length of optical fibers.

As mentioned above, in an FTTH related communication device, it is required to reduce the size of the communication device in consideration of an introduction of the communication device into every home, and accordingly high-density packaging of the communication device is also being pursued. In association with this, it is also required to reduce the size of the extra length accommodation structure for optical fibers for space saving. However, the size reduction of the extra length accommodation structure for optical fibers is limited because the optical fiber has an allowable minimum radius of curvature. If the size of the structure is forcibly reduced within this limit, the workability in accommodating the extra length of the optical fibers is reduced.

In the case of developing a compact desktop communication device for introducing an external optical cable, it is accordingly necessary to design an extra length accommodation structure for optical fibers which occupies a minimum space and provides good workability. The external optical cable to be introduced into the communication device is an optical cable having holder lines. Accordingly, the communication device has a fixing portion for fixing each holder line extending from the optical cable. The extra length of the optical fiber extending from the optical cable fixed by the fixing portion is wound around an optical fiber winding portion to thereby accommodate the extra length.

A free end of the optical fiber wound around the optical fiber winding portion is spliced to one end of another optical fiber connected at its other end to an optical connector. The conventional extra length accommodation structure has a splicing portion accommodation structure for accommodating such a splicing portion for splicing the two optical fibers. Thus, the extra length of the optical fiber is first wound around the winding portion, and the splicing portion is next accommodated into the splicing portion accommodation structure. In many cases, however, the length of the optical fiber wound around the winding portion does not become a suitable length for accommodation of the splicing portion. It is accordingly necessary to adjust the length of the optical fiber wound by adjusting a degree of tightness of winding of the optical fiber.

In the conventional extra length accommodation structure, there is not defined a space for ensuring a sufficient extra length of the optical fiber in winding the optical fiber because of the reduced size of the communication device. Accordingly, the length of the optical fiber extending from the fiber winding portion and connected to the optical connector must be adjusted at the winding portion, so as to engage the optical connector with another connector provided in the communication device. Thus, fine adjustment of the length of the optical fiber extending from the winding portion is required. This fine adjustment requires an additional operation of loosening the optical fiber once wound around the winding portion or rewinding the optical fiber.

Further, since the optical fiber is often loosely wound around the winding portion, a plurality of optical fiber pressure plates are provided to prevent escape of the optical fiber from the winding portion. These optical fiber pressure plates further reduce the workability in winding the optical fiber. In the conventional extra length accommodation structure, the optical fiber extending from the external optical cable and the optical fiber connected to the optical connector are wound around the common winding portion. Accordingly, in the case of checking optical input as to handle any troubles, there is a possibility that all the optical fibers must be unwound from the winding portion if the optical fiber connected to the optical connector is wound earlier than the other optical fiber.

SUMMARY OF THE INVENTION

It is therefore an object of the present invention to provide an extra length accommodation structure for optical fibers which allows an easy operation of handling the extra length of the optical fibers.

It is another object of the present invention to provide an extra length accommodation structure for optical fibers which allows an easy operation of handling the extra length of the optical fibers in a spatially sufficient space and also allows accommodation of the extra length in a compact communication device.

In accordance with an aspect of the present invention, there is provided an extra length accommodation structure for optical fibers, comprising a base; a first winding drum supported to said base so as to be pivotable between a first position where said first winding drum is positioned over said base and a second position where at least a part of said first winding drum is projected from said base; and a second winding drum supported to said base so as to be pivotable between a third position where said second winding drum is positioned over said base and a fourth position where at least a part of said second winding drum is projected from said base.

Preferably, the extra length accommodation structure further comprises a first support member mounted on the base so as to be pivotable between the first position and the second position, and the first winding drum is fixed to the first support member. Similarly, the extra length accommodation structure further comprises a second support member mounted on the base so as to be pivotable between the third position and the fourth position, and the second winding drum is fixed to the second support member.

The extra length accommodation structure further comprises a splicing portion accommodation structure for accommodating a splicing portion for splicing a first optical fiber and a second optical fiber constituting the above optical fibers. Preferably, the first winding drum is composed of a first semicircular drum and a second semicircular drum displaceably connected to the first semicircular drum. Similarly, the second winding drum is composed of a third semicircular drum and a fourth semicircular drum displaceably connected to the third semicircular drum.

Preferably, the first and second winding drums overlap each other in a vertical direction when the first winding drum is pivoted to the first position and the second winding drum is pivoted to the third position. With this arrangement, the extra length accommodation structure can be made compact.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
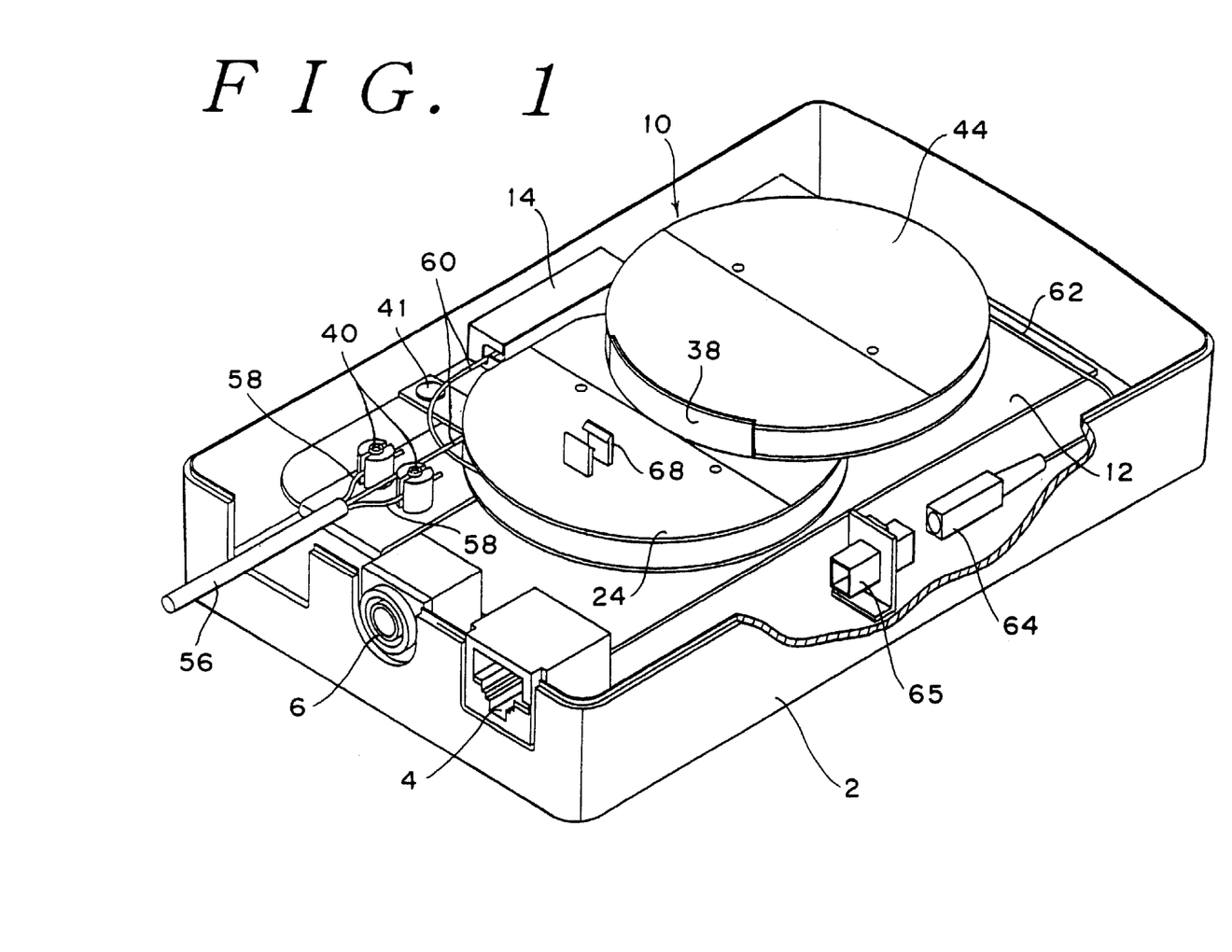
FIG. 1 is a perspective view of a preferred embodiment of the present invention contained in a communication device.
Figure 2:
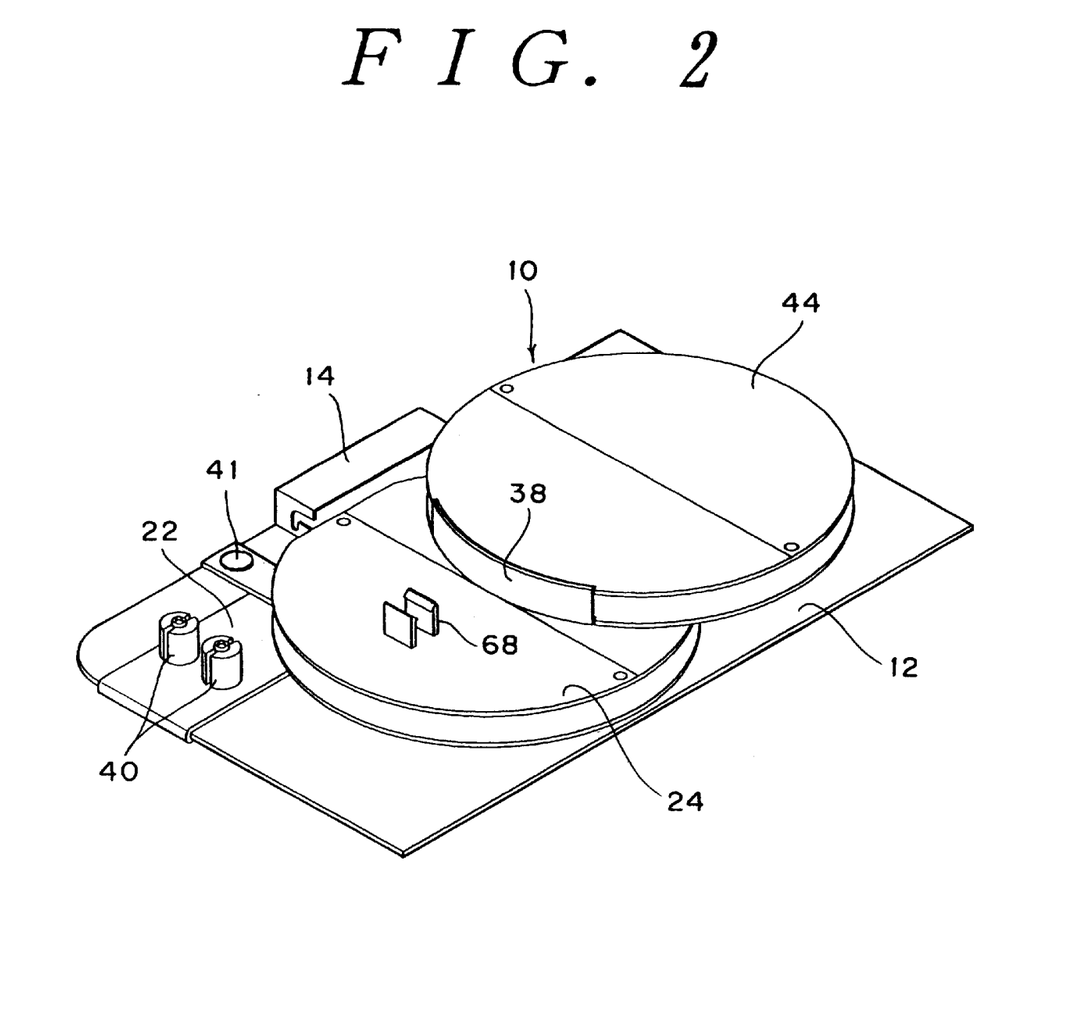
FIG. 2 is a perspective view of the preferred embodiment in a condition where the extra lengths of optical fibers are not yet accommodated.
Figure 3:
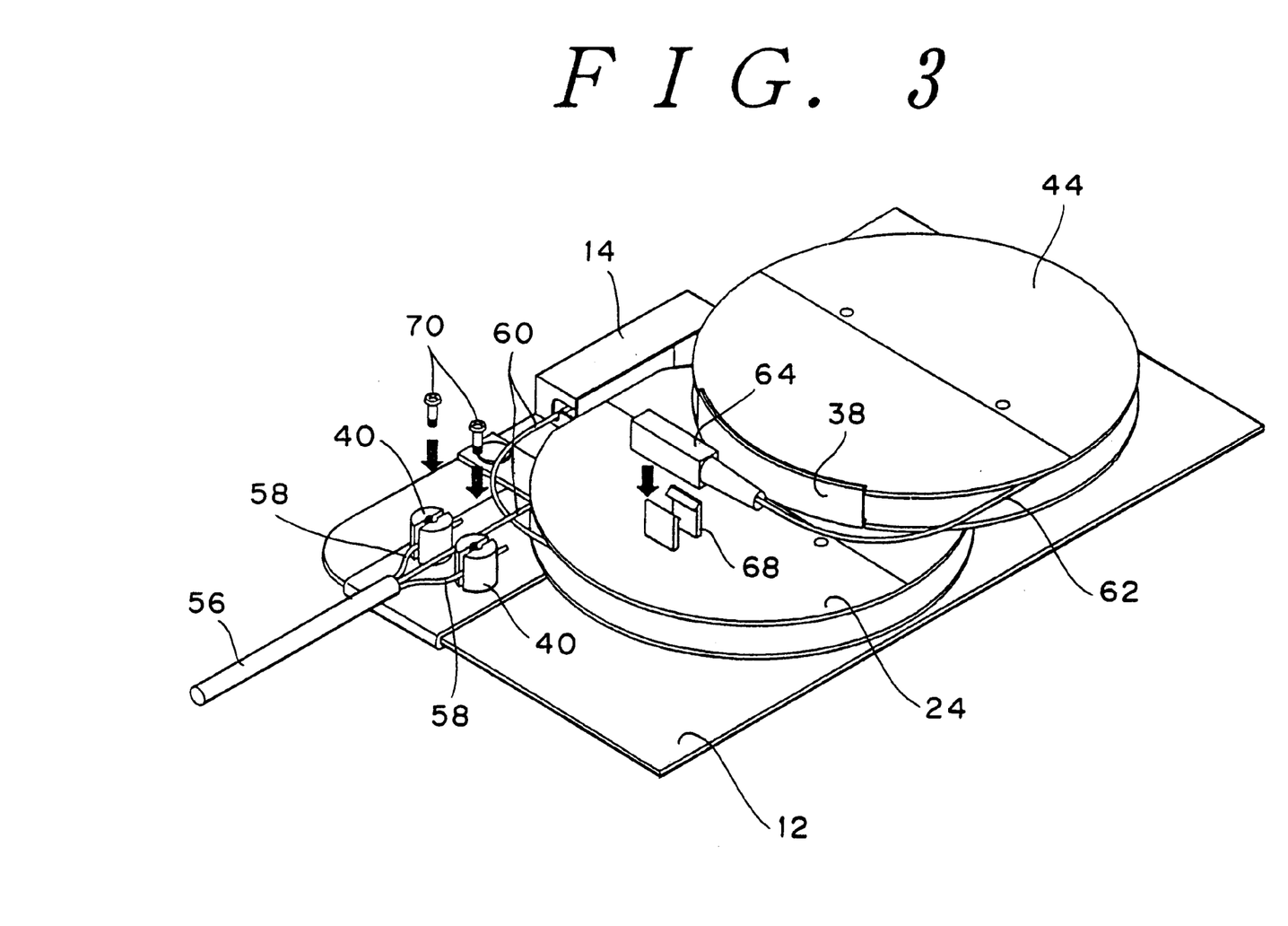
FIG. 3 is a perspective view of the preferred embodiment in a condition where the extra lengths of optical fibers are accommodated.

Referring to FIG. 1, there is shown a perspective view of an extra length accommodation structure 10 for optical fibers according to a preferred embodiment of the present invention contained in a communication device. The communication device is a compact desktop communication device installed in an FTTH related subscriber's home, for example. The extra length accommodation structure 10 for optical fibers is contained in a housing 2 of the communication device. A printed wiring board of the communication device on which an E/O module, O/E module, etc. (all not shown) are mounted is also contained in the housing 2. Reference numeral 4 denotes an electrical connector of the communication device, and reference numeral 6 denotes a receptacle for power reception. Referring to FIG. 2, there is shown a perspective view of the extra length accommodation structure 10 taken out of the housing 2. FIG. 3 is a perspective view similar to FIG. 2, showing a condition where the extra lengths of optical fibers are accommodated.

Figure 4A:
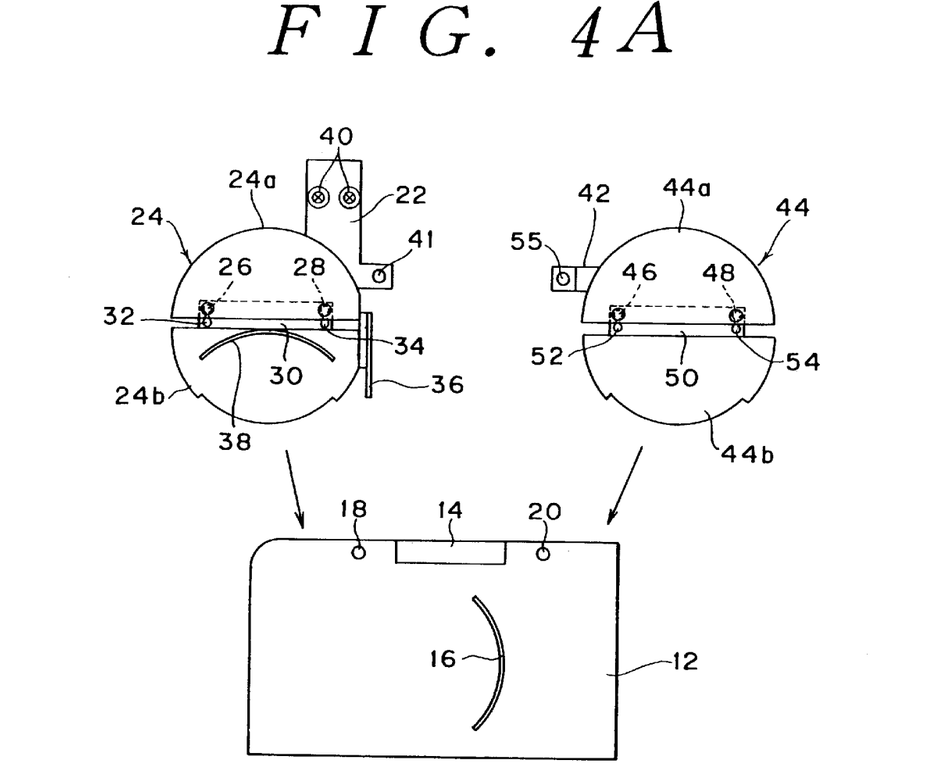
FIG. 4A is a plan view showing a condition prior to supporting first and second winding drums to a base.

As shown in FIG. 4A, a splicing portion accommodation structure 14 and a cover 16 for a first winding drum 24 are mounted on a base 12. The base 12 has two holes 18 and 20. A first support member 22 is fixed to the first winding drum 24. The first winding drum 24 includes a first semicircular drum 24a fixed to the first support member 22, and a second semicircular drum 24b movably connected to the first semicircular drum 24a. A pair of pins 26 and 28 are fixed to the first semicircular drum 24a.

The second semicircular drum 24b has a bracket 30. The bracket 30 is formed with a pair of elongated holes 32 and 34. The pins 26 and 28 of the first semicircular drum 24a are displaceably inserted in the elongated holes 32 and 34 of the bracket 30, respectively. With this structure, the second semicircular drum 24b is movable between a reduced diameter position where the drum 24b is in contact with the first semicircular drum 24a and an enlarged diameter position where the drum 24b is spaced a given distance from the first semicircular drum 24a. The first winding drum 24 is provided with a cover 36 for partially covering a side opening of the splicing portion accommodation structure 14 to be hereinafter described and a cover 38 for partially covering a side opening of a second winding drum 44 to be hereinafter described.

Figure 4B:
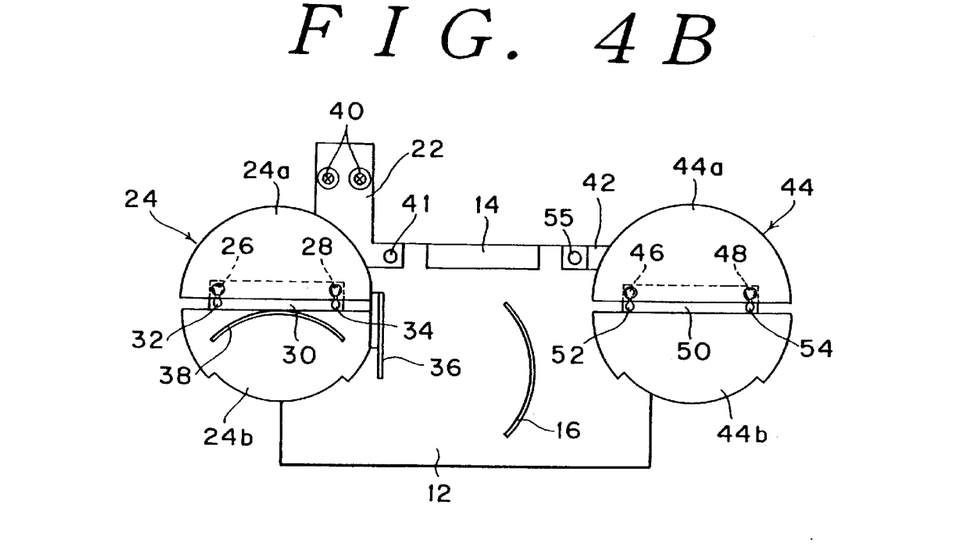
FIG. 4B is a plan view showing a condition where the first and second winding drums are supported to the base.

A pair of holder line fixing portions 40 and a pin 41 are fixed to the first support member 22. By inserting the pin 41 into the hole 18 of the base 12, the first winding drum 24 is supported through the first support member 22 to the base 12 so as to be pivotable between a first position where the drum 24 is positioned over the base 12 as shown in FIG. 2 and a second position where the drum 24 is partially projected from the base 12 as shown in FIG. 4B. Similarly, a second support member 42 is fixed to the second winding drum 44. The second winding drum 44 includes a third semicircular drum 44a fixed to the second support member 42, and a fourth semicircular drum 44b movably connected to the third semicircular drum 44a.

A pair of pins 46 and 48 are fixed to the third semicircular drum 44a. The fourth semicircular drum 44b has a bracket 50. The bracket 50 is formed with a pair of elongated holes 52 and 54. The pins 46 and 48 of the third semicircular drum 44a are displaceably inserted in the elongated holes 52 and 54 of the bracket 50, respectively. Accordingly, the fourth semicircular drum 44b is movable between a reduced diameter position where the drum 44b is in contact with the third semicircular drum 44a and an enlarged diameter position where the drum 44b is spaced a given distance from the third semicircular drum 44a.

A pin 55 is fixed to the second support member 42. By inserting the pin 55 into the hole 20 of the base 12, the second winding drum 44 is supported through the second support member 42 to the base 12 so as to be pivotable between a third position where the drum 44 is positioned over the base 12 as shown in FIG. 2 and a fourth position where the drum 44 is partially projected from the base 12 as shown in FIG. 4B.

Figure 5:
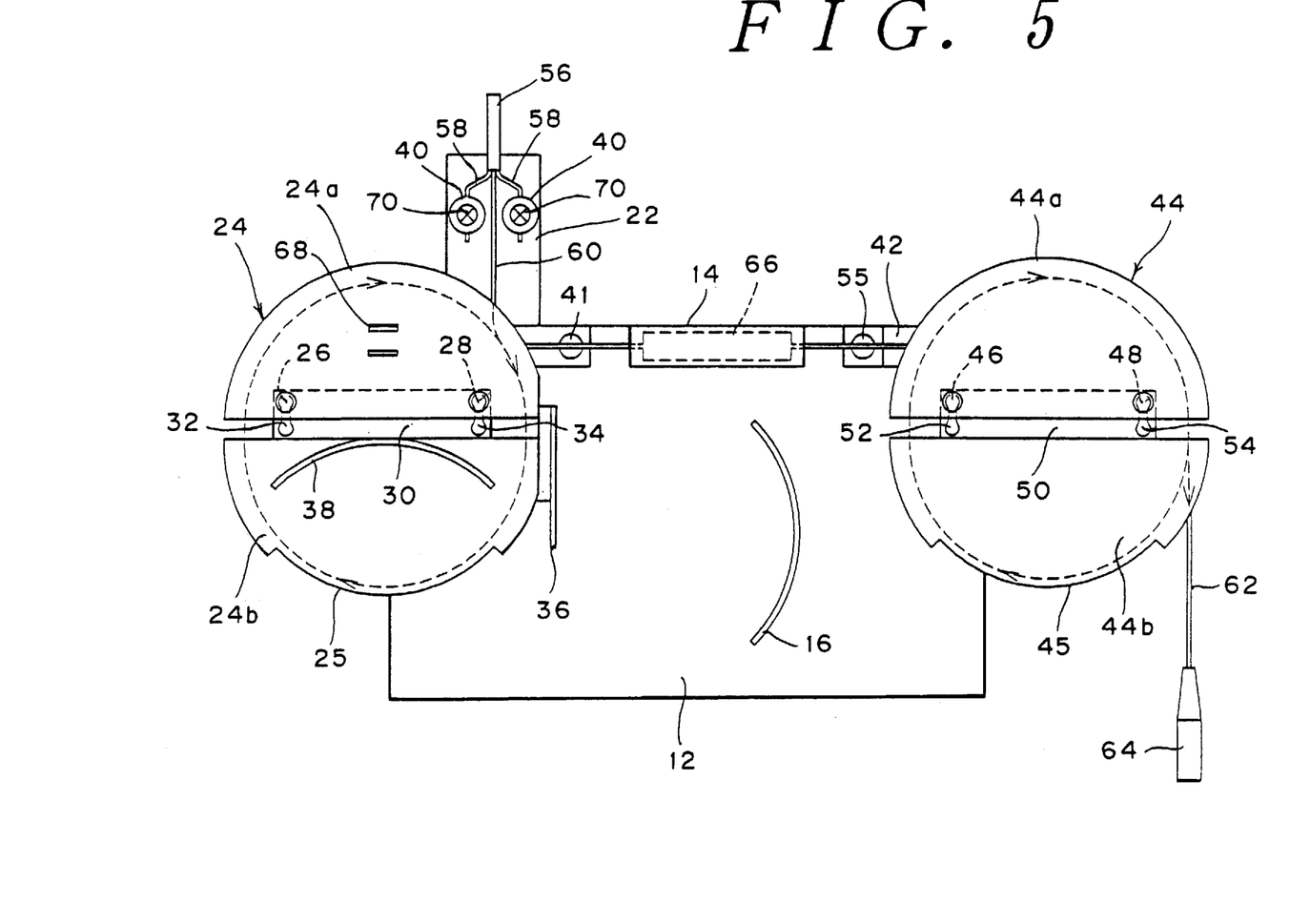
FIG. 5 is a plan view of the preferred embodiment in a condition where the extra lengths of optical fibers are wound around the first and second winding drums.

Referring to FIG. 5, there is shown a plan view of the preferred embodiment in a condition where the extra lengths of optical fibers are wound around the first winding drum 24 and the second winding drum 44. In this condition, the first winding drum 24 has the second position, and the second winding drum 44 has the fourth position. Reference numeral 56 denotes an optical cable having a pair of holder lines 58 formed of steel. The holder lines 58 are inserted in slits of the holder line fixing portions 40 and secured thereto by screws 70, respectively.

A first optical fiber 60 extends from the optical cable 56. On the other hand, a second optical fiber 62 is connected at its one end to an optical connector 64. Prior to accommodating the extra lengths of the first and second optical fibers 60 and 62, the optical fibers 60 and 62 are spliced together at a portion 66. Then, the first optical fiber 60 is wound around the first winding drum 24 to accommodate the extra length of the first optical fiber 60. In this winding operation, the number of windings around the first winding drum 24 is adjusted so that the splicing portion 66 is substantially located at the position of the splicing portion accommodation structure 14.

Similarly, the second optical fiber 62 is wound around the second winding drum 44 to accommodate the extra length of the second optical fiber 62. In this winding operation, the number of windings around the second winding drum 44 is adjusted so that the optical connector 64 and the end of the second optical fiber 62 connected thereto projects from the second winding drum 44 by a given length. Thereafter, the first winding drum 24 is pivoted to the first position, and the second winding drum 44 is pivoted to the third position, thereby obtaining a condition where the first and second winding drums 24 and 44 overlap each other in a vertical direction as shown in FIG. 3. Further, the optical connector 64 is inserted into a connector fixing portion 68 mounted on the first winding drum 24 for temporarily fixing the optical connector 64 as shown in FIG. 3.

Figure 10A:
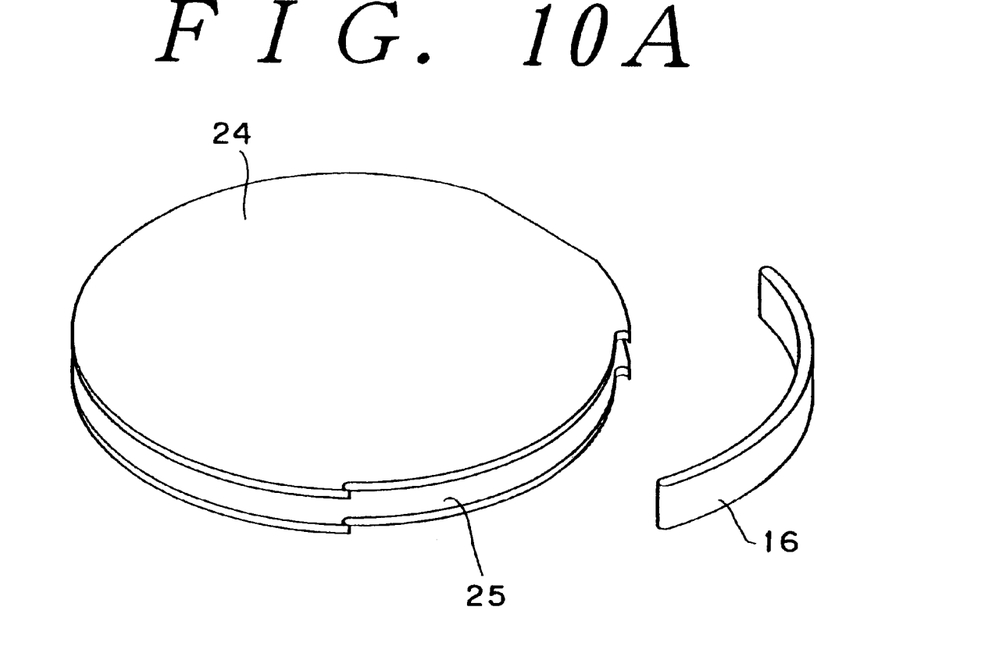
FIG. 10A is a perspective view showing the first winding drum and a cover.
Figure 10B:
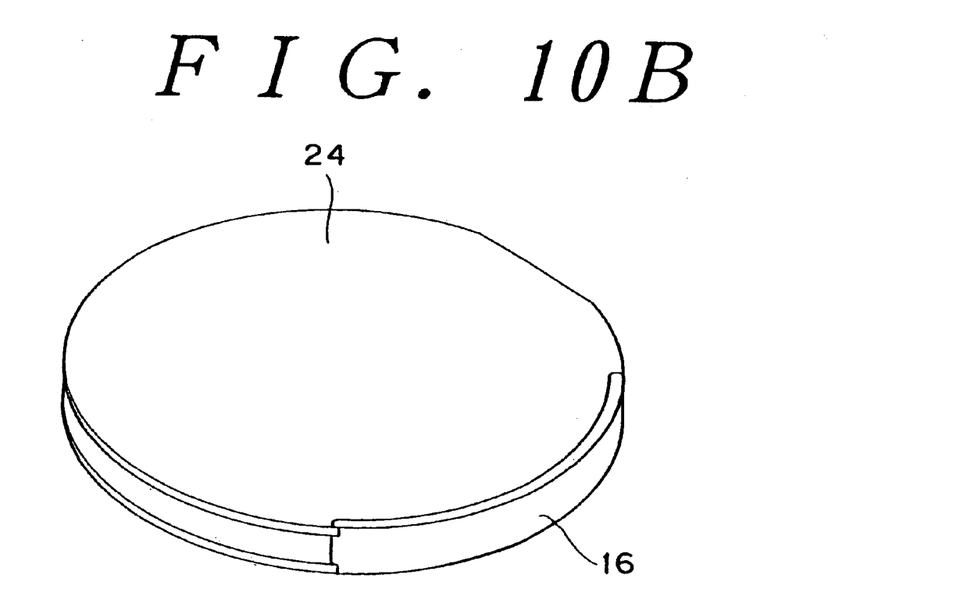
FIG. 10B is a perspective view showing a condition where the cover is engaged with an arcuate recess of the first winding drum.

As shown in FIG. 5 and FIG. 10A, the outer circumference of the first winding drum 24 is formed with an arcuate recess 25 for receiving the cover 16 mounted on the base 12. When the first winding drum 24 is pivoted to the first position, the cover 16 comes into engagement with the arcuate recess 25 of the drum 24 as shown in FIG. 10B, thereby preventing escape of the optical fiber 60 wound around the first winding drum 24. Similarly, the outer circumference of the second winding drum 44 is formed with an arcuate recess 45 for receiving the cover 38 mounted on the first winding drum 24. When the first winding drum 24 is pivoted to the first position and the second winding drum 44 is pivoted to the third position, the cover 38 comes into engagement with the arcuate recess 45 of the drum 44, thereby preventing escape of the optical fiber 62 wound around the second winding drum 44.

Figure 6A:
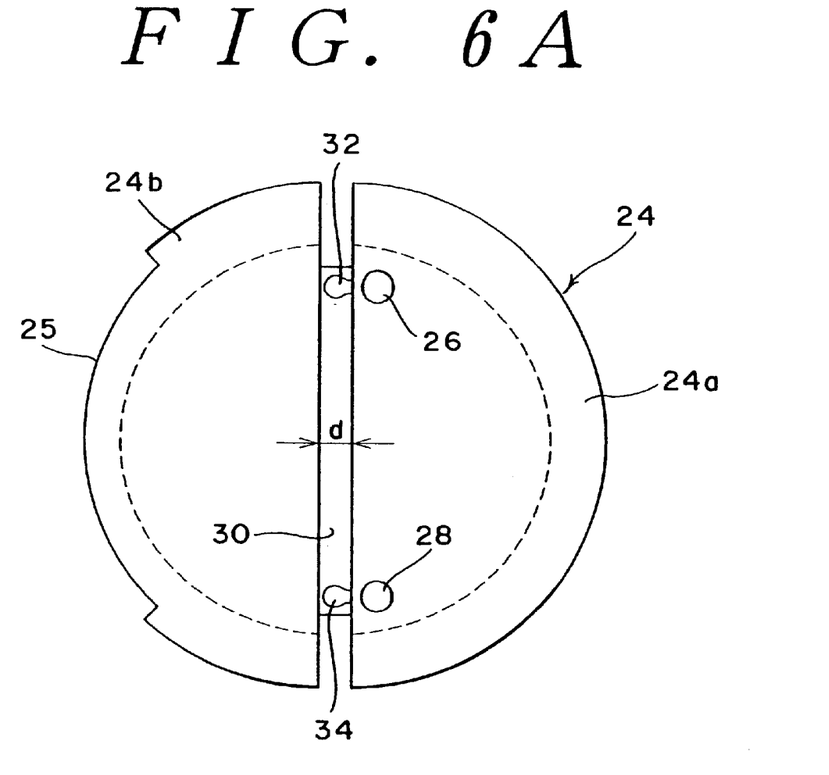
FIG. 6A is a plan view of the first winding drum in its diameter enlarged condition.
Figure 6B:
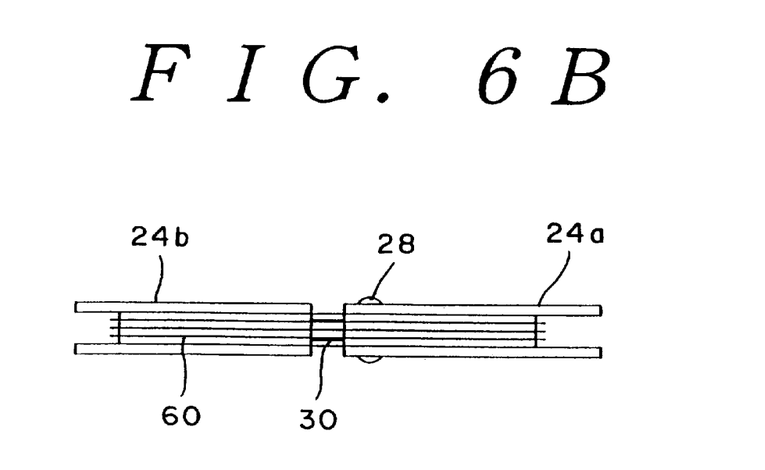
FIG. 6B is an elevational view of FIG. 6A.
Figure 7A:
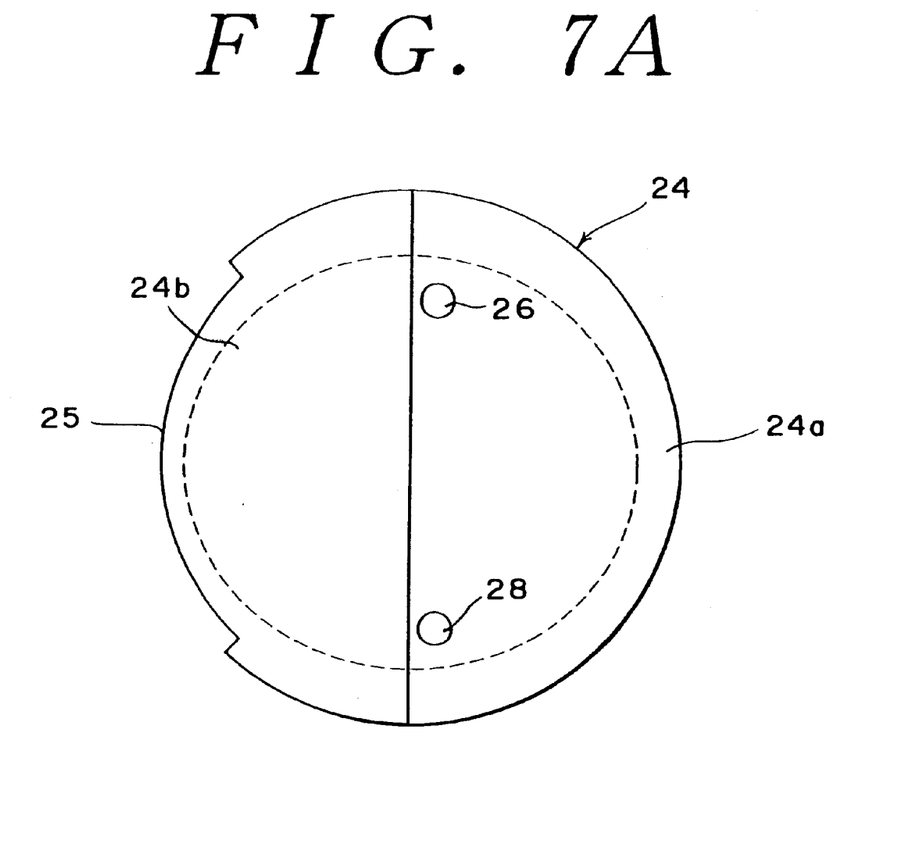
FIG. 7A is a plan view of the first winding drum in its diameter reduced condition.
Figure 7B:
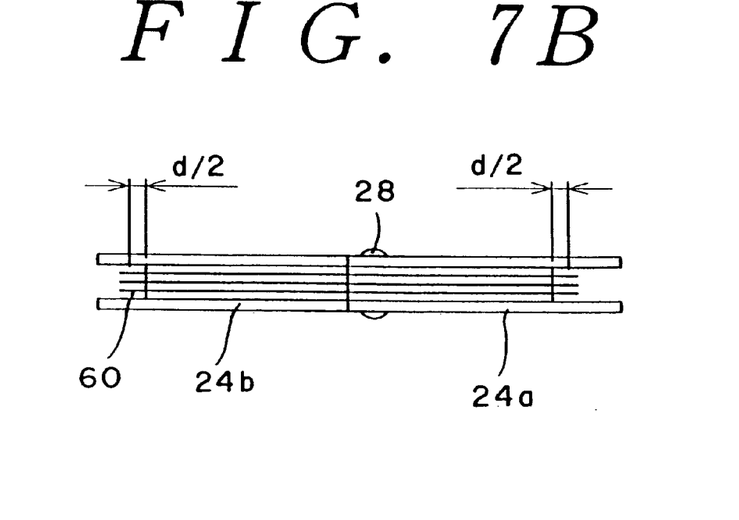
FIG. 7B is an elevational view of FIG. 7A.

FIG. 6A is a plan view of the first winding drum 24 in its diameter enlarged condition, and FIG. 6B is an elevational view of FIG. 6A. In contrast, FIG. 7A is a plan view of the first winding drum 24 in its diameter reduced condition, and FIG. 7B is an elevational view of FIG. 7A. As shown in FIG. 6A, the first semicircular drum 24a and the second semicircular drum 24b are spaced a distance d from each other. In the case that the optical fiber 60 is wound around the first winding drum 24 in this diameter enlarged condition and thereafter the diameter of the first winding drum 24 is reduced as shown in FIG. 7A, there is created a space of d/2 between the outer circumference of the first winding drum 24 and the loop of the optical fiber 60 as shown in FIG. 7B.

Accordingly, in winding the optical fiber 60, it is preferable to set the diameter enlarged condition of the first winding drum 24. After winding the optical fiber 60, the diameter of the first winding drum 24 is reduced, and the splicing portion 66 is accommodated into the splicing portion accommodation structure 14. At this time, there is a case that the splicing portion 66 may not reach the splicing portion accommodation structure 14, depending upon the length of the optical fiber 60. However, after reducing the diameter of the first winding drum 24, there is created a space between the loop of the optical fiber 60 and the outer circumference of the first winding drum 24 corresponding to the reduction in the diameter as shown in FIGS. 7A and 7B.

Accordingly, the optical fiber 60 can be pulled out of the first winding drum 24 by a length corresponding to this space, thus allowing fine adjustment of the length of the optical fiber 60. Further, it is unnecessary to arbitrarily loosely wind the optical fiber 60 around the first winding drum 24, so that the need for any fiber escape prevention structure such as optical fiber pressure plates used in the prior art can be eliminated.

The optical fibers 60 and 62 extending from the opposite ends of the splicing portion 66 are individually wound around the first and second winding drums 24 and 44, respectively. Accordingly, in the case of checking optical input as to handle any troubles, only the optical fiber 62 connected to the optical connector 64 can be removed regardless of the installation procedure. Similarly, the second winding drum 44 can also be changed in diameter between the diameter reduced condition and the diameter enlarged condition. Accordingly, the length of an end portion of the optical fiber 62 extending from the second winding drum 44 can be finely adjusted.

Figure 8:
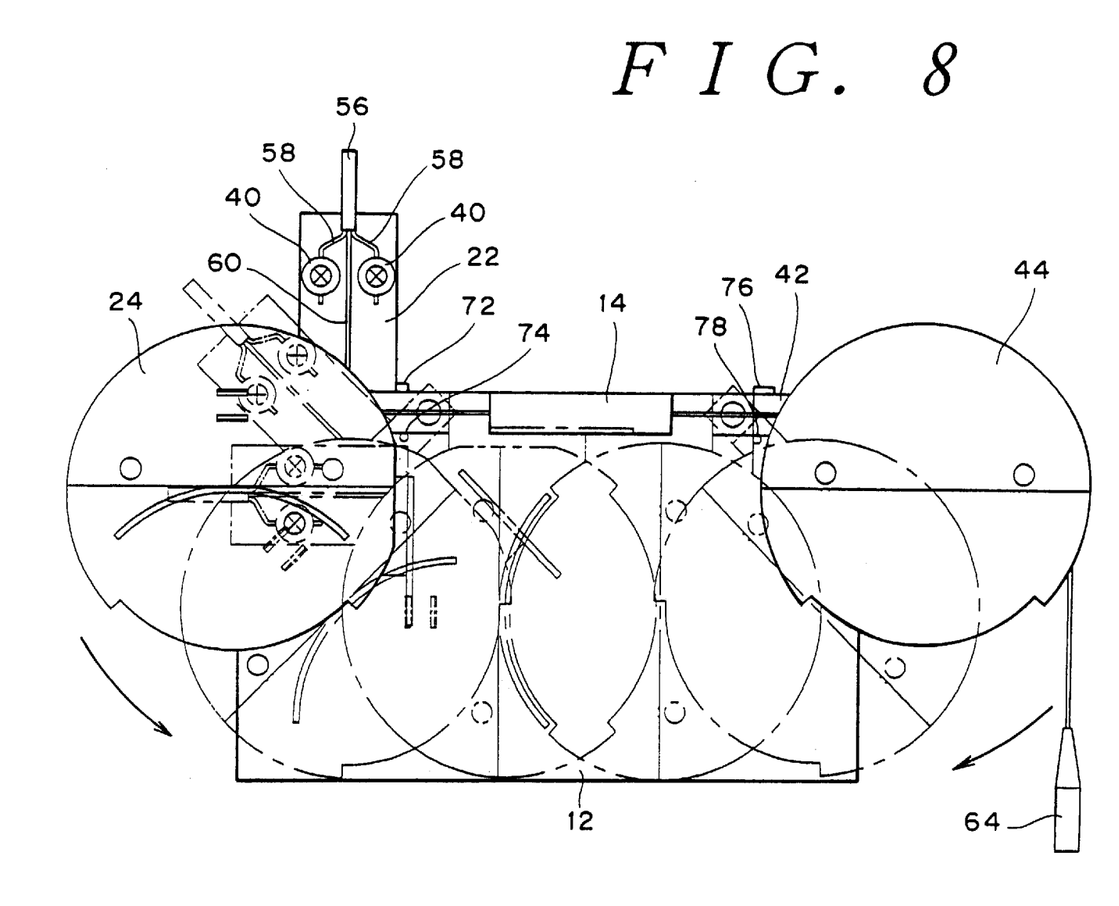
FIG. 8 is a plan view showing a pivotal motion of the first and second winding drums.

FIG. 8 shows a pivotal motion of the winding drums 24 and 44. When the first winding drum 24 is in the second position, the drum 24 is retained in the second position by a stopper 72 and a projection 74 provided on the base 12. When the first winding drum 24 is pivoted to the first position, the drum 24 is retained in the first position by the stopper 72 and the projection 74. Similarly, when the second winding drum 44 is in the fourth position, the drum 44 is retained in the fourth position by a stopper 76 and a projection 78 provided on the base 12. When the second winding drum 44 is pivoted to the third position, the drum 44 is retained in the third position by the stopper 76 and the projection 78.

Figure 9A:
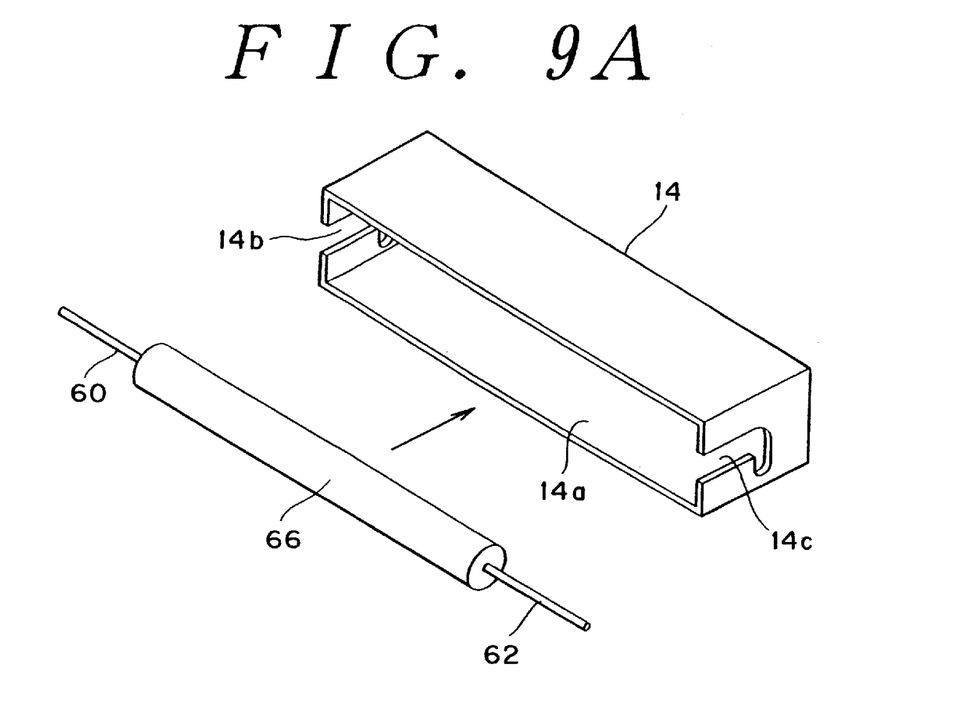
FIG. 9A is a perspective view showing a condition prior to accommodating a splicing portion into a splicing portion accommodation structure.

Referring to FIG. 9A, the splicing portion accommodation structure 14 is a box-shaped contained having one side opening 14a. The opposite ends of the structure 14 is formed with slits 14b and 14c. The splicing portion 66 is accommodated into the structure 14 from the side opening 14a in such a manner that the optical fibers 60 and 62 are inserted into the slits 14b and 14c, respectively.

Figure 9B:
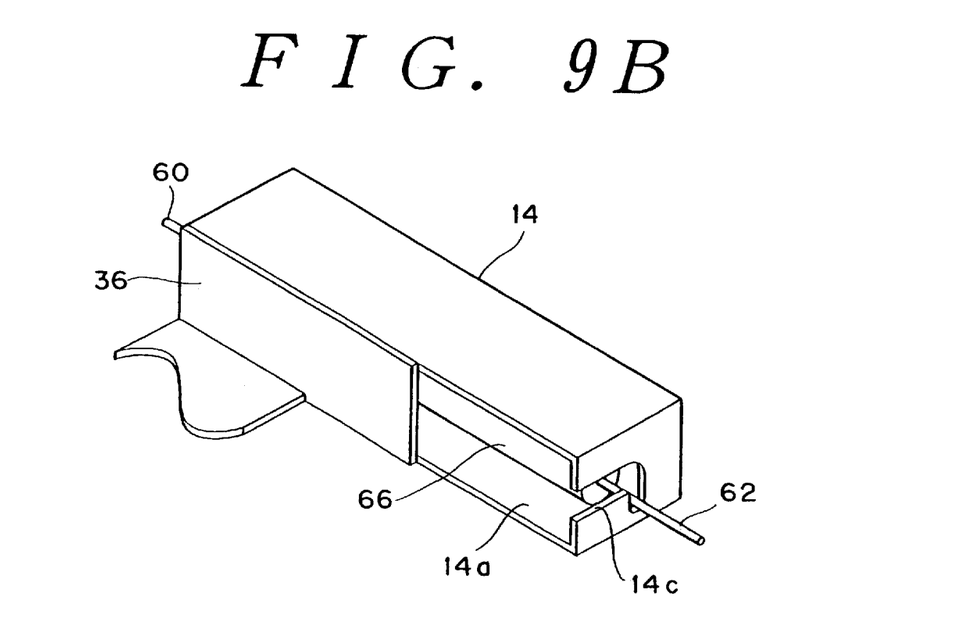
FIG. 9B is a perspective view showing a condition where the splicing portion is accommodated in the splicing portion accommodation structure.

When the first winding drum 24 is pivoted to the first position, the cover 36 mounted on the first winding drum 24 partially closes the side opening 14a of the splicing portion accommodation structure 14 as shown in FIG. 9B to thereby prevent escape of the splicing portion 66 out of the structure 14. The extra length accommodation structure 10 for the optical fiber in the condition where the extra lengths of the optical fibers 60 and 62 are accommodated as shown in FIG. 3 is contained into the housing 2 as shown in FIG. 1. Thereafter, the optical connector 64 is removed from the connector fixing portion 68 and next engaged into a connector 65 provided in the housing 2.

According to the extra length accommodation structure for the optical fiber of the present invention, the operation of handling the extra lengths of optical fibers can be easily carried out. That is, the first and second winding drums are pivotably supported to the base, and the optical fibers are wound around the first and second winding drums in the respective second and fourth positions where the drums are partially projected from the base. Accordingly, the operation of winding the optical fibers can be performed in a spatially sufficient condition. After finishing the fiber winding operation, the first and second winding drums are pivoted to the first and third positions, respectively. Accordingly, the extra length accommodation structure can be compactly contained in the housing of the communication device.

What is claimed is:

1. An extra length accommodation structure for optical fibers, comprising:

a base;

a first winding drum supported to said base so as to be pivotable between a first position where said first winding drum is positioned over said base and a second position where at least a part of said first winding drum is projected from said base; and a second winding drum supported to said base so as to be pivotable between a third position where said second winding drum is positioned over said base and a fourth position where at least a part of said second winding drum is projected from said base.

2. An extra length accommodation structure according to claim 1, further comprising:

a first support member mounted on said base so as to be pivotable between said first position and said second position, for fixedly supporting said first winding drum; and a second support member mounted on said base so as to be pivotable between said third position and said fourth position, for fixedly supporting said second winding drum.

3. An extra length accommodation structure according to claim 2, further comprising means mounted on said first support member for fixing holder lines extending from an optical cable.

4. An extra length accommodation structure according to claim 3, further comprising a splicing portion accommodation structure fixed to said base for accommodating a splicing portion for splicing a first optical fiber and a second optical fiber constituting said optical fibers, said first optical fiber extending from said optical cable.

5. An extra length accommodation structure according to claim 4, wherein:

said second optical fiber is connected to an optical connector; and said first winding drum has means for temporarily fixing said optical connector.

6. An extra length accommodation structure according to claim 2, wherein:

said first winding drum comprises a first semicircular drum fixed to said first support member and a second semicircular drum connected to said first semicircular drum so as to be movable between a reduced diameter position where said second semicircular drum is in contact with said first semicircular drum and an enlarged diameter position where said second semicircular drum is spaced a given distance from said first semicircular drum; and said second winding drum comprises a third semicircular drum fixed to said second support member and a fourth semicircular drum connected to said third semicircular drum so as to be movable between a reduced diameter position where said fourth semicircular drum is in contact with said third semicircular drum and an enlarged diameter position where said fourth semicircular drum is spaced a given distance from said third semicircular drum.

7. An extra length accommodation structure according to claim 1, further comprising a splicing portion accommodation structure fixed to said base for accommodating a splicing portion for splicing a first optical fiber and a second optical fiber constituting said optical fibers.

8. An extra length accommodation structure according to claim 7, further comprising a first cover mounted on said first winding drum for covering at least a part of a side surface of said splicing portion accommodation structure when said first winding drum is pivoted to said first position.

9. An extra length accommodation structure according to claim 8, further comprising:

a second cover fixed to said base for covering a part of a side surface of said first winding drum when said first winding drum is pivoted to said first position, and a third cover mounted on said first winding drum for covering a part of a side surface of said second winding drum when said first and second winding drums are pivoted to said first and third positions, respectively.

10. An extra length accommodation structure according to claim 1, wherein said first winding drum pivoted to said first position and said second winding drum pivoted to said third position overlap each other in a vertical direction.

* * * * *